United States Patent [19]

Case

[11] 4,358,671
[45] Nov. 9, 1982

[54] CHECK PROCESSING SYSTEM

[76] Inventor: John M. Case, 35 Lehigh Rd., Wellesley, Mass. 02181

[21] Appl. No.: 276,928

[22] Filed: Jun. 24, 1981

Related U.S. Application Data

[63] Continuation-in-part of Ser. No. 75,510, Sep. 13, 1979, abandoned.

[51] Int. Cl.³ .............................................. G06K 1/14
[52] U.S. Cl. .................................. 235/379; 235/493; 235/494
[58] Field of Search ..................... 235/379, 493, 494

[56] References Cited
U.S. PATENT DOCUMENTS 4,007,355 2/1977 Moreno .............................. 235/379

Primary Examiner—Harold I. Pitts
Attorney, Agent, or Firm—Elmer J. Gorn

[57] ABSTRACT

A system which, by means of a specially devised instrument, affords the option of processing checks by Electronic Funds Transfer (EFT) procedure. The system includes a specially designed check having a punch out or other machine readable element which, by its presence and position, identifies the instrument as a check which may be processed by such EFT procedure. The check is also imprinted with certain covenants, which are stated as pertaining only to the processing of the check by EFT procedures. Therefore the check may also be used in completely routine fashion. The system is adapted to interpret such punch out or other machine readable elements and accompanying MICR data so as automatically route this check, as well as other types of banking instruments, in appropriate manners through clearance channels to the proper drawee.

5 Claims, 4 Drawing Figures

FIG. 2

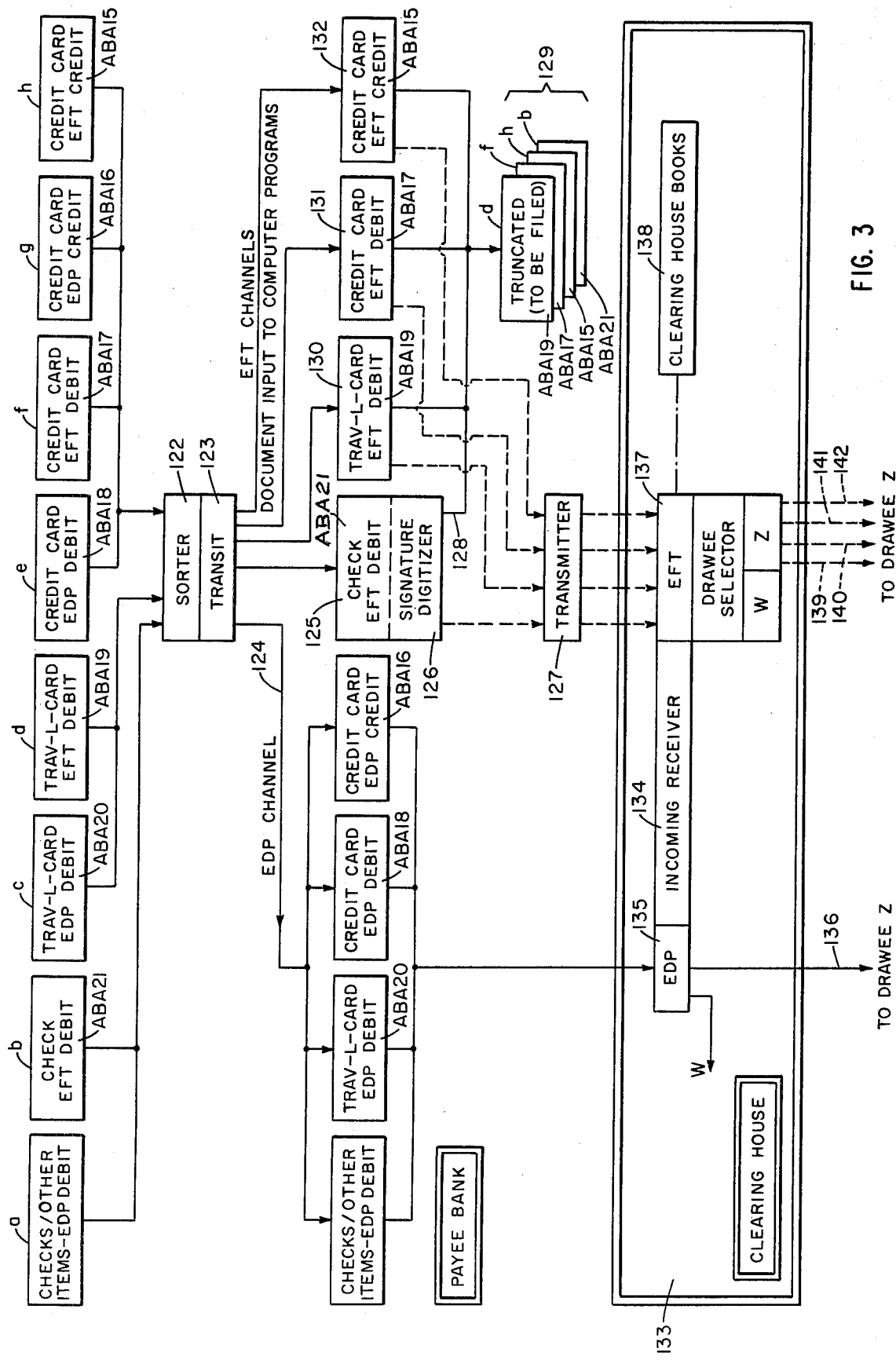

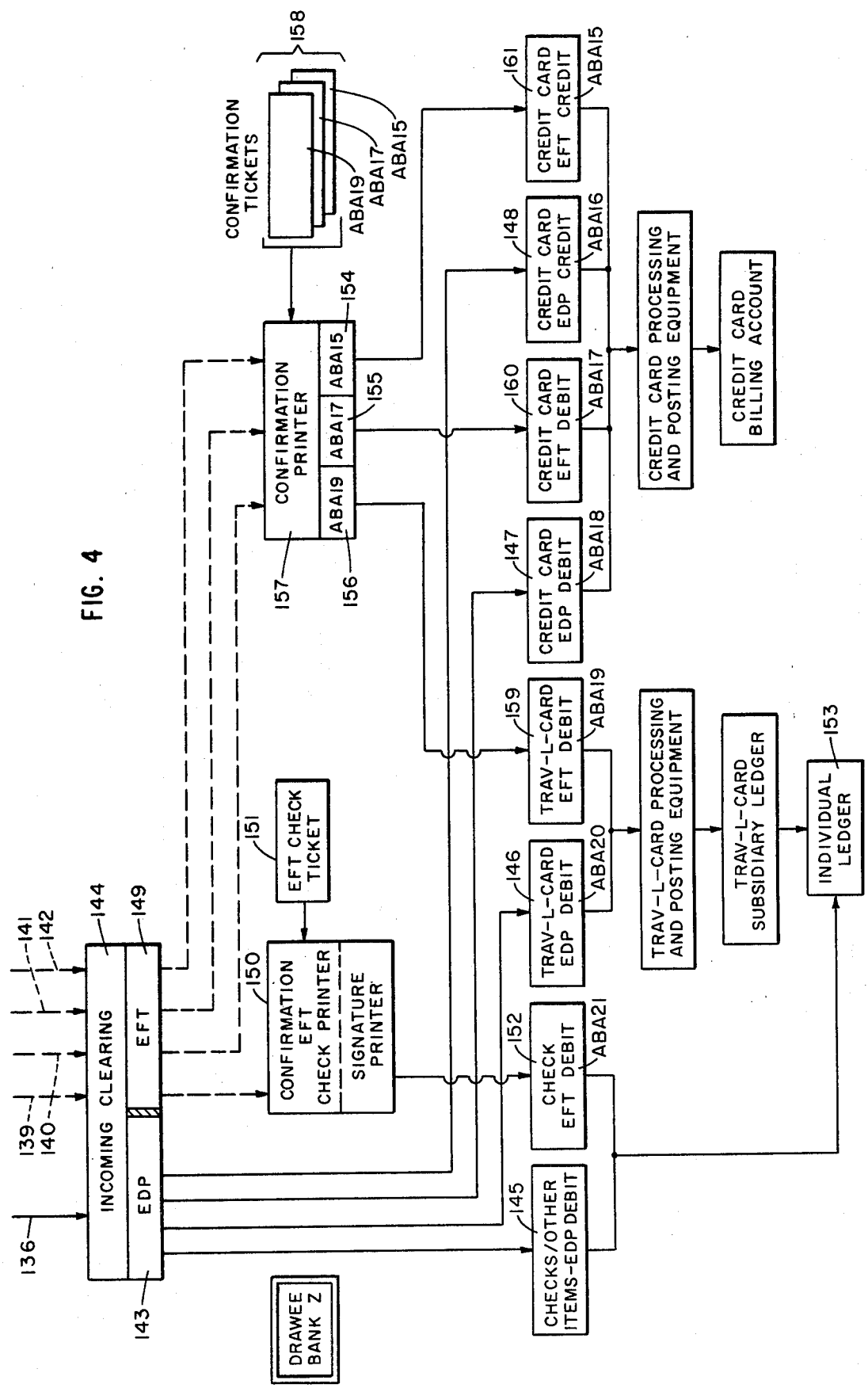

CHECK PROCESSING SYSTEM

This is a continuation-in-part of my prior application Ser. No. 75,510, filed Sept. 13, 1979, entitled, "CHECK PROCESSING SYSTEM".

BACKGROUND OF THE INVENTION

An EFT system designed for the widest practical use in the transfers of funds should have the capability of accommodating all of the commonly used instrumentalities in posting transactions which involve banking services such as credit cards, debit cards, traveller's checks, and bank deposit accounts. Such a system should be capable of being integrated into existing funds transfer systems with a minimum of equipment changes and additions. Certain basic aspects of such a system are described in my copending U.S. Patent Applications, Ser. No. 944,412, now U.S. Pat. No. 4,172,552 entitled, "Credit Card Processing System:", and Ser. No. 924,200, now Patent 4,270,042 entitled, "Electronic Funds Transfer System". The latter is designed to process by EFT means transactions under the "Letter of Credit Device" described and claimed in my prior U.S. Pat. No. 4,017,101. It is important that conventional Electronic Data Processing (EDP) check processing procedures should exist side by side with any "Letter of Credit Device" described and claimed in my prior U.S. Pat. No. 4,017,101. It is important that conventional Electronic Data Processing (EDP) check processing procedures should exist side by side with or EFT system, so that either may be selected to accommodate institutions which are provided with EFT handling equipment as well as those institutions lacking such equipment. Thus the system described in Application Ser. No. 944,412 now U.S. Pat. No. 4,172,552 is shown as being capable of also simultaneously processing ordinary bank checks by EDP.

The present invention, which is completely compatible with present bank check clearing routines, comprises a novel improvement in the clearance system and involves the use of a novel form of bank check and a machine controlled system such that each individual check may be accorded a conventional EDP settlement mode, or for an EFT mode involving truncation of the check, whether at the bank first deposit or optionally at the drawee bank. The integration of the newly devised bank check handling capability into the presently existing system, creates an expanded overall system capable of processing the transfer of funds for virtually all types of funds transfer instrumentalities.

SUMMARY OF THE INVENTION

The invention comprises a system for the clearance processing of checks by EFT. A standard check augmented by certain covenants is provided for use in the system. The check is preprinted by the drawee bank with an indication that it is available for EFT use, but is so printed only if such drawee bank is equipped to offer such facility. It is also preprinted in MICR characters with identification of the drawee bank, the account number of the maker and a preassigned individual account number for the check. It is also prepunched at a predetermined space within the optional section of the ABA Standard's along the marginal edge of the check in which the MICR characters are placed. The presence and location of the punch out defines the instrument as a check susceptible of being processed by EFT procedures. The check also is a preprinted with a number of convenants with respect to its treatment at the bank of first handling which simplifies the transfer of all necessary information required for authentication to the drawee bank. The check, when deposited by the payee is completed by the payee bank which adds, in MICR characters, the amount of the check which is then fed into check clearing channels.

This EFT check processing system is capable of being integrated into a system adapted to receive the various additional types of instruments referred to above. This latter system segregates such various types by the presence and position of the punch out which each type of instrument has in a position which defines the type involved. The EFT checks are fed into a signal encoder which encodes the MICR character information into message form and also encodes a visual image of the signature into message form. Both types of messages are then transmitted through clearance channels to the drawee bank for reproduction of the MICR information and reproduction of the signature to permit verification at the drawee bank.

The broader system, of which this system is an important segment, may also be adapted to process all of the other types of instruments, and also provides an alternate EDP capability where such a capability is required or desired.

DESCRIPTION OF THE PREFERRED EMBODIMENT

Brief Description of the Drawings

FIG. 2 is a chart showing the space allocation of each item of information placed in accordance with the American Bankers Association space allocation for MICR information along the marginal edge of each of the types of funds transfer instruments referred to in this application;

FIG. 3 is a diagrammatic representation of that portion of the present system as it appears at the payee bank and a clearing house; and FIG. 4 is a diagrammatic representation of the rest of the system as it appears at the drawee bank.

FIG. 1, the novel bank check 100 has preprinted on its face by the drawee bank (identified at 101) a series of special items. The first is a notation at 102 that the bank of first handling (payee bank), to which the check is submitted, may accord the check an EFT mode of settlement. The permissive character of this notation is also an indication that the alternative of the usual EDP settlement may also be employed where the bank of first handling is not equipped with an EFT capability or is unwilling to use such EFT capability. Two convenants of the drawer of the check are also printed on the face of the check at a convenient location 103, such as the left hand margin. The wording which may be inserted at 103, is shown in the dotted block 104. These two covenants are indicated as applying "UNDER EFT USAGE".

Figure 1:
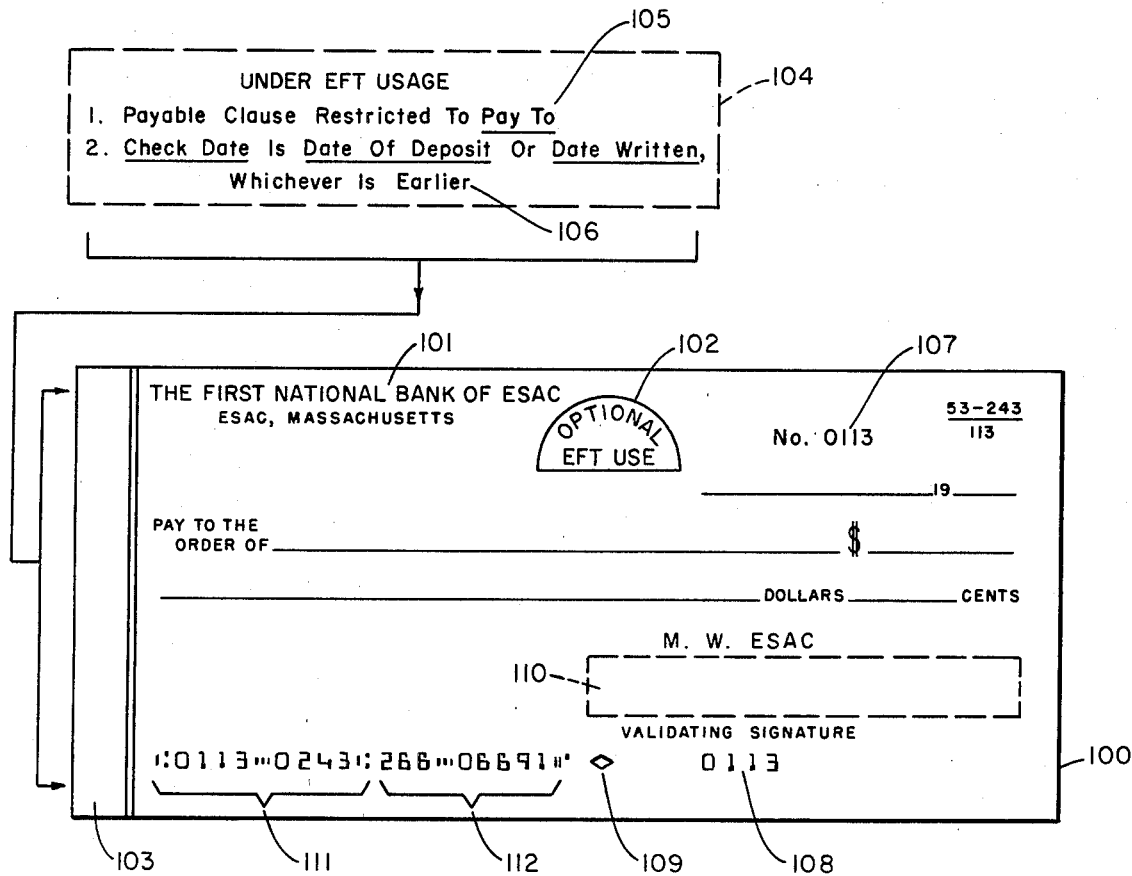
FIG. 1 is an obverse view of an exemplary embodiment of the novel check adapted for use in the funds transfer system.

The first covenant at 105 "Payable Clause Restricted To *Pay To*" is to the effect that the drawer or maker requires direct deposit of the check into banking channels and therefore second endorsements are not permitted. As will be pointed out below, since only validation of the known signature of the maker of the check is provided for, the complication of attempting to validate the signature of a second endorser is avoided. The second covenant at 106 is that *"Check Date Is Date Of Deposit* Or *Date Written,* Whichever Is Earlier". Therefore the maker authorizes the bank of deposit to treat the date of the check as either the date of its deposit at the payee bank or the date written, which ever is earlier. The effect is to eliminate post-dating of the check either by accident or on purpose. Of course, for EDP use, the date on the check will have its usual meaning.

Each check will also be preprinted with an individual check number, not only in conventional ink at the usual location at 107, but also at 108 in MICR (Magnetic Ink Character Recognition) printing within four set locations on the MICR printing line along the bottom edge of the check. As will be set forth in greater detail below, such MICR preprinting of the check number will enable the EFT mode of check settlement to provide the maker with an unambiguous identification of the check in any descriptive statement which may be supplied by the drawee bank to the maker.

To properly guide the check through the correct processing channels of the improved system, it is prepunched by the drawee bank at the time of printing at 10 in a uniquely predetermined location on the MICR line. Detection of this punch out at such location by a payee bank that offers EFT facilities, as by optical scanning equipment, will result in the check being machine segregated, at the time it enters banking channels, for subsequent EFT handling. If the payee's bank equipment is not capable of detecting the punch out, the existence of the punch out is meaningless and EDP clearance automatically results. Also, the system is so designed that, when no punch out exists at such location, the check will be segregated by all payee banks for conventional EDP settlement. In some cases, the bank of first deposit may be unwilling to handle the settlement of the check by EFT procedures. In such cases the bank may cause the placement of the check in the segregated group for conventional EDP settlement.

The check is also provided with a designated area 110 within which the signature of the maker is to be written. Since, for purposes of enabling the drawee bank to make a signature verification, the system is designed to transmit the signature and reproduce it at the drawee bank, such area is carefully selected so as to present the written signature in appropriate relation to the signature reading portion of the transmitter.

In accordance with usual practice the check is preprinted along the MICR line at 111 with the routing symbol of the drawee bank and at 112 with the account number of the check maker.

Figure 2:
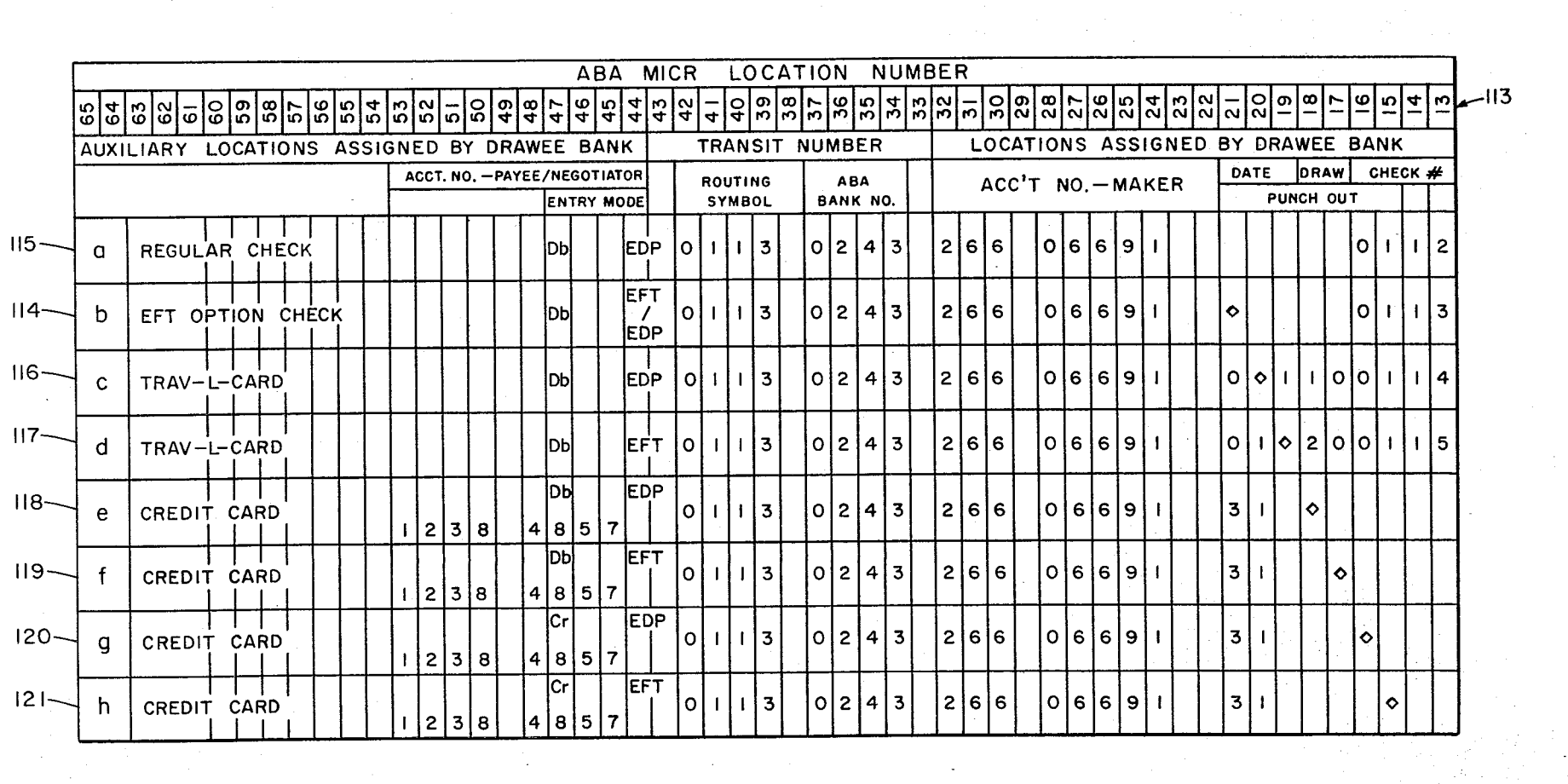

FIG. 2 is a chart showing the space allocation of each item of information which appears along the MICR printing line in accordance with the American Bankers Association's (ABA) space allocation standards. The numbers appearing in the blocks along the line 113 are those which the ABA uses to identify individual spaces in its standards. As will be explained below, the present system allocates the positioning of information along this line so as to present, to the mechanisms involved in the system, a sufficient amount of unambiguous data which permits the system to process each of the types of instruments normally used to transfer funds.

It will be noted that space numbers 1-12 do not appear at the right hand end of line 113. These spaces are reserved for encoding, at the payee bank, the dollar amount of the check in the well known manner. This will be done normally at initial processing of the check.

The information as shown on the check of this invention is allocated as shown along line 114, "EFT Option Check". ABA MICR spaces 13-16 are reserved for the check number. As shown in FIG. 1, that number is preprinted at 108. ABA MICR spaces 17-20 are left blank, since they are reserved in the overall system for the identification of selected elements of other types of funds transfer instruments. In ABA MICR space 21, the drawee bank prepunches the punch out shown in FIG. 1 at 109. Although the punch out is not in MICR form, in the preferred embodiment, its position number may be designated as ABA 21.

ABA MICR spaces 22-32 are available for assignment by the drawee bank for printing the account number of the maker of the check. In FIG. 1 it will be seen that this number is preprinted at 112.

Under standard banking practice it is required that the routing symbol and the ABA bank number of the drawee bank be printed in ABA MICR spaces 34-42. As shown in FIG. 1 this information is preprinted at 111.

None of the ABA MICR 44-65 spaces on the FIG. 1 check need to have any information printed on them, since the information, as shown in FIG. 1, is sufficient to cause the system properly to process the funds transfer involved. Additionally, ABA MICR spaces 44 and above exist only where other than a minimum sized check under the ABA standards is involved.

When a REGULAR CHECK is negotiated, the information which it carries on the ABA MICR line is shown along line 115 in FIG. 2. This information is exactly the same as for the EFT OPTION CHECK of FIG. 1, except that a REGUAR CHECK will not have a punch out.

The other instruments to be processed by the system to be described below are the TRAV-L-CARD as described and claimed in my prior U.S. Pat. No. 4,017,101, as well as the TRAV-L-CARD and the CREDIT CARD transactions as described and claimed in the system of my copending applications Ser. No. 924,200 and Ser. No. 944,412. The information encoded in the MICR line in each case and the manner in which it is used is set forth in detail in each instance. It will be noted that, in each case, the instrument is provided with a punch out which defines the type of instrument which is involved and the manner in which it is to be processed. Compatibility between all of these instruments in the common system is insured by the unique location of its punch out in each case. A TRAV-L-CARD to be processed by EDP will have its punch out located in ABA space 20, as shown in FIG. 2 along line 116. A TRAV-L-CARD to be processed by EFT will have its punch out in ABA space 19 as shown along line 117. A CREDIT CARD to be processed for debit by EDP will have its punch out in ABA space 18 as shown along 118, while, if it is to be processed for debit by EFT, its punch out will be in ABA space 17 as shown along line 119. A CREDIT CARD to be processed for credit by EDP will have its punch out in ABA space 16, as shown along line 120, while if it is to be processed for credit by EFT, its punch out will be in ABA space 15, as shown along line 121.

The reasons for the placement of the other data for TRAV-L-CARDS and CREDIT CARDS, as shown at ABA MICR locations 17-21 and 45-53 and the manner in which the system interprets and handles such information is detailed in my respective patent and applications referred to above.

The initial segment of the system for processing the novel check together with the other instruments listed on FIG. 2, is shown in FIG. 3. This is the system portion which is located at the payee bank and at the clearing house. Each of the instruments listed on FIG. 2 as items a, b, c, d, e, f, g, and h, are also shown as similarly codes along the top of FIG. 3, which are also respectively items 114 through 121 in FIG. 2. Any or all of such items deposited at a payee bank for debit or credit are fed by the payee bank into a sorter 122. Such a sorter is adapted, as by use of an optical scanner, to detect and identify the position of each of the punch outs and to segregate the documents into five different groups as described below.

Any documents which do not have punch out will be placed in the EDP group and delivered by a transit device 123 into an EDP channel 124. Any document designated by its punch out as being an EDP item will also be delivered by said transit device into said EDP channel. As pointed out above, any payee bank, which is not equipped or unwilling to provide an EFT settlement, will deposit all documents physically into a single EDP channel in which said documents will be intermingled. The payee bank will gather all items from the EDP channel and physically forward them to the clearing house.

When sorter 122 detects a punch out at ABA space 21, it will recognize the document as a check to be processed by EFT procedures and will direct the transit device 123 to deliver the check into a signal encoder 125. Encoder 125 is adapted to read the data recorded in MICR characters along the bottom edge of the check and translate such data into a digitized and standardized signal format. Encoder 125 is also provided with a signature reading section 126 which will optically scan the 110 area on check 100 and translate the image of the signature on the 110 area also into a digitized signal format. A combined digitized message containing the MICR data and the image of the signature is delivered to a transmitter 127 for transmission to an appropriate receiver at the clearing house. The payee bank will preface each daily batch of messages which it sends to the clearing house with the date of the transmission and with its ABA assigned bank number. Such data will be encoded into transmitter 127 in standard digitized form to be decoded by receivers at the clearing house and at the drawees bank to ascertain such date and drawee bank number.

After the data from one of the novel checks of the system has been read by the signal encoder 125, the check is physically deposited into a document channel 128 for delivery to a truncating file 129 where it may be stored until an appropriate time to be destroyed.

Each of the other items d, f, and h, of FIG. 2, characterized by its punch out to be processed by EFT, will be delivered respectively to signal encoders 130, 131, and 132 each programmed to interpret and encode the MICR data of the items in accordance with the particular character of the item. The digitized encoded signals from the encoders 130, 131, and 132 will each be delivered to the transmitter to be transmitted as separate segments of a combined signal message to the clearing house receiver. The items d, f, and h, which have been read by their respective encoders 130, 131, and 132 are also delivered into the document channel 128 for disposal in the truncating file 129.

As shown in FIG. 3, the clearing house 133 has an incoming receiver department 134 with an EDP receiving section 135 to which are delivered all of the EDP items. In accordance with well known practices, the clearing house personnel will make the appropriate entries on its books, and then forward the documents to the various institutions W, Z, etc. to which they are directed. For example, delivery channel 136 will go to drawee bank Z.

The receiving department 134 also has an EFT receiver 137 which does not receive any physical documents, but only the messages sent to it by transmitter 127 at the payee bank. The EFT receiver will select, from the EFT messages received by it, the appropriate data for its clearing house books 138, EFT receiver 137 will then separate the messages intended for each drawee bank into separate groups and relay the entire message in each case to the appropriate drawee W, Z, etc. For example, message line 139, relating to the EFT check b in FIG. 3, will carry the data relating to said check to drawee Z, while message lines 140, 141, and 142 will carry the data relating to items d, f, and h, to such drawee.

FIG. 4 diagrams the portion of the system as it exists at drawee bank Z. The channel 136 delivers all of the EDP items addressed to drawee Z into the EDP section 143 of its incoming clearing department 144. These items will be physically sorted and sent respectively to sections 145, 146, 147, and 148 designated to process items a, c, e, and g, by EDP.

Message line 139, carrying the data with respect to the check b, will be received by an EFT message receiver 149 which will deliver the message to a special ticket printer 150. That printer will be supplied with blank tickets from a supply 151 upon which the printer will print all of the MICR data relayed to it through the system. In addition, the printer will decode the digitized message representing the signature on the check and print an accurate replica of that signature on the confirmation ticket or check form. Each confirmation check, thus printed, will be delivered to the EFT check validation section 152 of the issuer bank where the reproduced signature can be authenticated and the check cleared for payment on the books 153 of issuer Z. Due to the covenants originally imprinted on the check by drawee Z, it knows that the payee bank has assumed the responsibility of crediting payment of the check only to the entity designated by the maker on the face of the check and therefore drawee Z has no need of confirming that the payment has been credited as so required. Likewise drawee Z is not concerned with the date of the check since one of the convenants preprinted on the check constitutes an assurance that the check has not been post dated but was actually payable when it was deposited with the beneficiary. Obviously this greatly simplifies the amount of work at the drawee bank heretofore involved with validation.

It will be noted that the incoming message to receiver 149 will have associated with it the ABA identifying number of the payee bank and the date of the message transmission. This information is usually recorded only in the journal of the drawee bank so that if, for some audit retrace purpose, a complete copy of the check itself or if additional information regarding the content of the check is required from the payee bank, a message completely identifying the transaction may be sent directly to the payee bank. For this reason the period during which the original check is kept in the payee's truncating file will be sufficient for any such purpose.

It is to be understood that the preferred embodiment, as detailed above, constitutes but one embodiment of the invention and that other variations may suggest themselves to those skilled in the art. For example, instead of a punch-out any other machine readable element could be used. Likewise, should other forms of machine readable characters, other than MICR characters, become commonly accepted for use in funds transfer systems, such machine readable characters might be substituted in the system of the present invention.

Various other modifications, within the scope of the appended claims, will suggest themselves to those skilled in the art.

I claim:

1. A system for processing checks in EFT procedures comprising:
   (a) a check in the form of a document provided with a machine readable element located at a preselected position in one of the optional ABA standard's positions in the marginal edge of documents reserved for MICR imprintation, said position being preselected to define the nature of the document as a check susceptible to be processed by EFT procedures;
   (b) said check being printed with a set of MICR characters along said marginal edge, said characters defining information required to enable the transfer of funds to be carried out, said check also having a predetermined space upon which the signature of the maker is to be written;
   (c) sorting means into which said check is fed by the payee with whom the documents are deposited, said sorting means being adapted to segregate said check in response to the detection by said sorter of the presence and position of said machine readable element;
   (d) a transit device being adapted to deliver said segregated check into a check signal encoder;
   (e) said signal encoder being adapted to encode into message form said printed MICR information and also being adapted to visually scan said signature space and to encode the image of said signature into message form;
   (f) message transmitting means for transmitting said encoded messages through clearance channels to the drawee; and
   (g) means at said drawee for decoding the signature message and for reproducing a substantial duplicate of said signature upon a confirmation ticket.

2. A system as in claim 1 which is also adapted to process a plurality of different kinds of funds transfer documents, said system, in addition to said checks, also comprising:
   (a) a plurality of separate types of documents such as credit cards and the like, each type being provided with a machine readable element located at a different preselected position in one of said optional ABA standard's positions, each of said positions being preselected to define the document as an EFT document, the nature of the document and the nature of the transaction which it represents;
   (b) said sorting means also being adapted to receive each of said additional types of documents together with said checks, said sorter means being adapted to segregate each kind of document received by it into a separate group in response to the detection by said sorter of the presence and position of said machine readable elements;
   (c) said transit device also being adapted to deliver said additional kinds of funds transfer documents into additional signal encoders;
   (d) each of said additional signal encoders being adapted to encode into message form the MICR information of the document delivered thereto;
   (e) said message transmitting means also being adapted to transmit said additional encoded messages through said clearance channels to the drawee; and
   (f) means at said drawee for decoding each additional message and for reproducing a substantial duplicate of each of said additional documents upon a separate confirmation ticket.

3. A system as in claim 1 or claim 2 in which said sorting means is also adapted to segregate documents which do not have an EFT defining machine readable element from documents having such a machine readable element, said transit device also being adapted to deliver said documents which do not have an EFT defining machine readable element into a separate EDP channel for conventional EDP settlement outside of the present system.

4. A system as in claim 3 in which said sorting means is also adapted to segregate additional documents having specially positioned machine readable elements designating such additional documents as EDP documents and in which said transit device is also adapted to deliver such additional EDP documents into said EDP channel.

5. A system as in claims 1, 2, 3, or 4 in which each of said machine readable elements is a punch out.

* * * * *